United States Patent Office 3,657,418
Patented Apr. 18, 1972

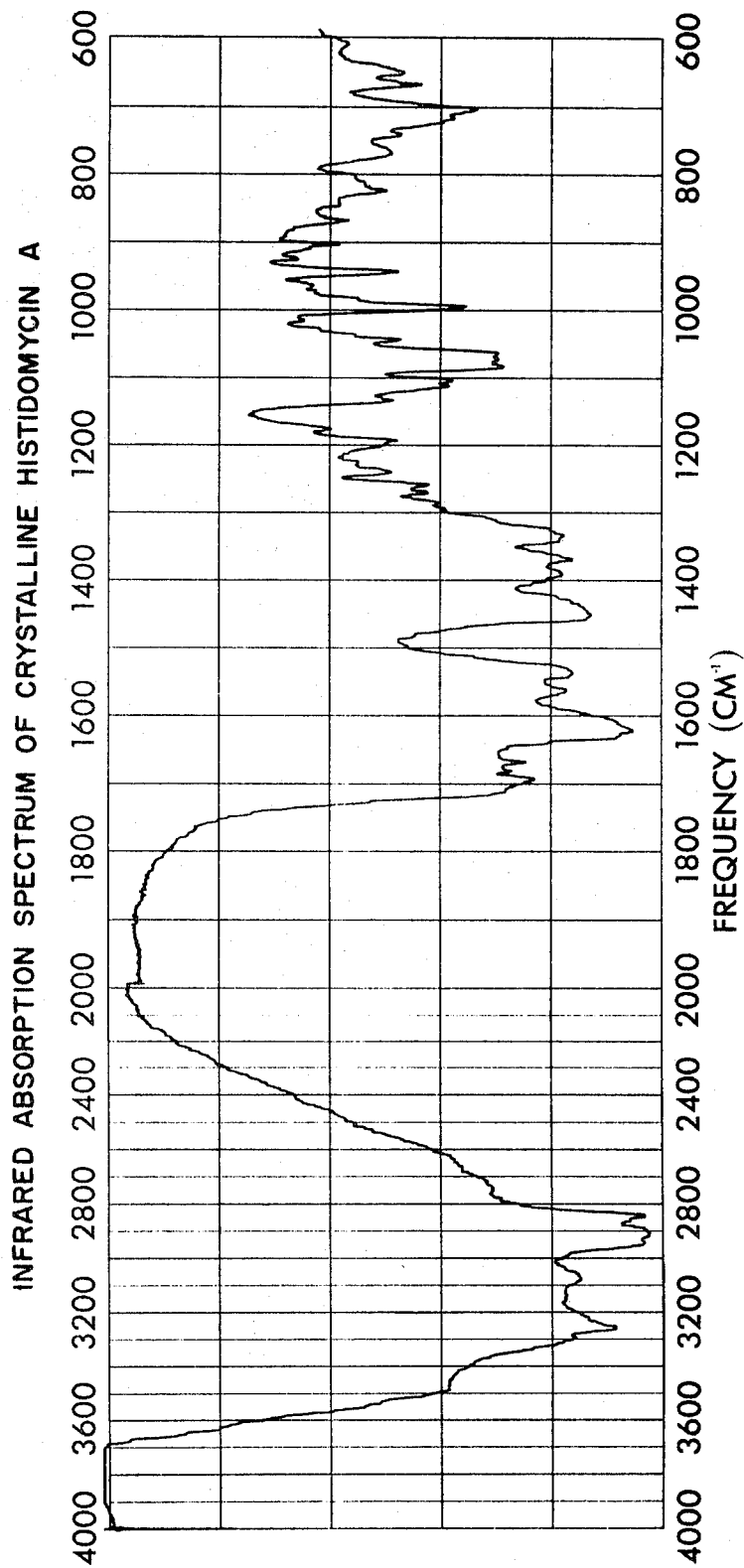

3,657,418
ANTIBIOTIC HISTIDOMYCIN
Thomas C. Demny, Roselle Park, N.J., assignor to Merck & Co., Inc., Rahway, N.J.
Continuation of application Ser. No. 589,258, Oct. 25, 1966. This application Aug. 27, 1968, Ser. No. 767,021
Int. Cl. A61k 21/00
U.S. Cl. 424—118                    3 Claims

ABSTRACT OF THE DISCLOSURE

Histidomycin, an antibiotic containing two active components, histidomycin A and histidomycin B, is produced by growing Nocardia histidans. The new antibiotics are antimicrobial agents active against gram-positive and gram-negative bacteria.

---

This application is a continuation-in-part of U.S. Ser. No. 589,258, filed Oct. 25, 1966, now abandoned.

This invention relates to new antibiotic agents and processes for preparing the same. More particularly, it is concerned with a novel antibiotic complex hereinafter also called histidomycin, the two active components of this antibiotic, hereinafter called histidomycin A and histidomycin B, and with processes for their production.

It is an object of this invention to provide new antibiotics known as histidomycins having characteristic spectrums and exhibiting activity against gram-positive and gram-negative bacteria. It is another object to provide methods of producing these antibiotics by fermentation. Other objects will be apparent from the detailed description hereinafter provided.

The new antibiotic substances of the present invention are formed by growing under controlled conditions a previously unknown species of microorganism which has been named Nocardia histidans. The microorganism was isolated from a sample of soil from California. This new microorganism has been designated Nocardia histidans and has been given the number MA-1157 in the culture collection of Merck & Co., Inc., Rahway, N.J. A culture thereof has been deposited with the American Type Culture Collection, Washington, D.C., and added to its permanent culture collection as ATCC 21021.

The morphological and cultural characteristics of Nocardia histidans are set forth in the following table:

NOCARDIA HISTIDANS

Morphology

Vegetative growth forms medium-length, generally straight hyphae with short, straight branches. Some fragmentation of hyphae into rods and short branched filaments. Terminal swellings and swollen oval or coccal segments in hyphae are seen. Growth shows cone-shaped projections with sparse aerial spikes. Aerial mycelium is sparse, short and straight, developing only over colony—most visible on egg albumen agar. Growth is attached to surface of agar medium.

Tomato paste-oatmeal agar

Brown vegetative growth with highly wrinkled, parchment-like surface that cracks and curls. Aerial mycelium very sparse. Very slight brownish discoloration of medium.

Czapek-Dox agar

Cream-colored, smooth vegetative growth. Aerial mycelium very sparse. No soluble pigment.

Glycerol-asparagine agar

Tan, dry, slightly wrinkled vegetative growth. Aerial mycelium very sparse. Light brown soluble pigment.

Nutrient starch agar

Cream-colored vegetative growth, smooth in center with slight ridging along edge. No aerial mycelium. No soluble pigment. Starch hydrolyzed.

Nutrient agar

Cream-colored, smooth, glistening vegetative growth. No aerial mycelium. No soluble pigment.

Egg albumen agar

Cream-colored, hard, wrinkled vegetative growth. Aerial mycelium moderate, white. No soluble pigment.

Potato plug

Smooth, slightly glistening, thin, cream-colored vegetative growth. No aerial mycelium. No soluble pigment. Growth only moderate as compared to other media.

Milk agar

Tan vegetative growth. No aerial mycelium. Light tan soluble pigment. Casein hydrolyzed.

Calcium malate agar

Cream-colored vegetative growth. Whitish aerial mycelium giving velvety appearance to growth. No soluble pigment. Utilizes malate.

Tyrosine agar

Vegetative growth smooth, cream-colored. No aerial mycelium. No soluble pigment. No decomposition of tyrosine.

Loeffler's blood serum agar

Cream-colored, glistening vegetative growth forming membrane along slant. No aerial mycelium. No soluble pigment. No liquefaction.

Peptone-iron-yeast extract agar

Tan vegetative growth. No aerial mycelium. No pigmentation of medium.

Yeast extract-dextrose stab

Tan vegetative growth on surface. Growth extending down ⅓–½ length of stab. No soluble pigment.

Nutrient gelatin agar

Vegetative growth, cream-colored with smooth center and somewhat ridged edge. No soluble pigment. Weak liquefaction.

Gelatin stab

Partial surface ring and poor flaky growth near surface. No soluble pigment. No liquefaction.

Skim milk

Tan surface ring of vegetative growth. Soft coagulum with partial clearing at top. No soluble pigment. pH 6.0.

Litmus milk

Tannish surface ring. No apparent change in consistency. pH 6.2.

Nitrate reduction

Nitrates not reduced to nitrites in organic medium.

Temperature

No growth at 50° C.

Carbohydrate utilization (Pridham-Gottlieb method)

Glucose+     Maltose+
Xylose—     Inositol±
Arabinose+     Lactose +
Rhamnose+     Sucrose±
Raffinose—     Mannitol—
Mannose+     Fructose+

+—Positive utilization.
±—Slight or doubtful utilization.
——No utilization.

Paraffin
No growth.
Cellulose
No growth.
Not acid fast

All growth readings taken after 3 weeks' incubation at 28° C. Physiological properties checked at 1 week and 3 weeks at 28° C.

It is possible to differentiate MA-1157 from all species of Nocardia described in Bergey's Manual of Determinative Microbiology, 7th edition, and in The Actinomycetes, volume 2, by Waksman. For this reason, a new species name has been coined. Since the new antibiotic is the most characteristic property of the culture, the name *Nocardia histidans* has been chosen.

The most closely related organism is *Nocardia mesenterica*. The differences, shown in the following table, are significant and justify establishment of a new species.

| *Norcardia histidans*: MA-1157 | *Nocardia mesenterica* Description taken from the Actinomycetes, volume 2. |
|---|---|
| Morphology: Aerial mycelium is sparse, short and straight, developing only over colony. | No aerial mycelium. |
| Milk: Soft coagulum with partial clearing at top. | No proteolytic action. |

| *Norcardia histidans*: MA-1157 | *Nocardia mesenterica* Description taken from Bergey's Manual, 7th edition. |
|---|---|
| Morphology: As above | As above. |
| Milk: As above | As above. |
| Nitrate reduction: Nitrates not reduced to nitrites. | Nitrites produced from nitrates. |

The second most closely related culture described in Bergey's Manual is *Nocardia flavescens*. The differences, shown in the following table, in characteristics carry through several media and provide justification for setting apart a new species.

| *Norcardia histidans*: MA-1157 | *Norcardia flavescens* Description taken from Bergey's Manual, 7th edition. |
|---|---|
| Morphology: Medium-length hyphae; aerial mycelium short. | Long . . . hyphae aerial mycelium . . . fairly long hyphae. |
| Nutrient agar: Cream-colored | Dark yellowish gray. |
| Potato plug: Thin, cream-colored growth. | Mycelium much raised and wrinkled, first cream-colored, later yellowish-brown. |

The above description of the microorganism producing histidomycins is given as illustrative of suitable strains of *Nocardia histidans* which can be used in producing these new antibiotics, but it is to be understood that the present invention is not limited to organisms answering this particular description. The present invention also contemplates the use of other species of *Nocardia histidans* which are mutants of the described organism, such as those obtained by natural selection or those produced by mutating agents, for example, X-ray irradiation, ultra-violet irradiation, nitrogen mustards, and the like.

Histidomycins are produced during the aerobic fermentation of suitable aqueous mediums, under conditions described hereinafter, by strains of *Nocardia histidans*. Aqueous mediums such as those employed for the production of other antibiotics are suitable for the production of histidomycins. Such mediums contain sources of carbon and nitrogen assimilable by the microorganisms and inorganic salts. In addition, the fermentation mediums contain traces of metals necessary for the growth of the microorganisms which are usually present in complex sources of carbon and nitrogen in the medium.

In general, the carbohydrates such as sugars, for example, glucose, arabinose, rhamnose, maltose, lactose, and the like, are suitable sources of assimilable carbon in the nutrient mediums. The exact quantity of the carbon source which is utilized in the medium will depend, in part, upon the other ingredients of the medium, but it is usually found that an amount of carbohydrate between about 1% and 6% by weight of the medium is satisfactory. These carbon sources can be used individually or several such carbon sources may be combined in the medium.

Various nitrogen sources such as casein hydrolysates, soybean meal, distiller's solubles, yeast extract, and the like are readily assimilated by *Nocardia histidans* and can be used in the fermentation mediums for the production of the new antibiotic. In general, it is found that organic sources of nitrogen, particularly soybean meal and distiller's solubles, are very satisfactory for the production of histidomycin. The various organic and inorganic sources of nitrogen can be used either alone or in combination in amounts ranging from about 0.2–6% by weight of the aqueous medium.

The following are examples of mediums suitable for growing *Nocardia histidans* and producing histidomycins:

MEDIUM 1

Dextrose—10.0 g.
L-asparagine—1.0 g.
$K_2HPO_4$—0.1 g.
$MgSO_4 \cdot 7H_2O$—0.5 g.
Yeast extract—0.5 g.
Trace element solution [1]—10.0 ml.
Distilled water—1000 ml.
pH—7.2

[1] See the following table:

Trace element solution $FeSO_4 \cdot 7H_2O$—1.0 g.
$MnSO_4 \cdot 4H_2O$—1.0 g.
$CuCl_2 \cdot 2H_2O$—0.025 g.
$CaCl_2$—0.10 g.
$H_3BO_3$—0.056 g.
$(NH_4)_6MoO_2 \cdot 4H_2O$—0.019 g.
$ZnSO_4 \cdot 7H_2O$—0.20 g.
Distilled water—1000 ml.

MEDIUM 2

Soybean meal—30.0 g.
Distillers solubles—7.5 g.
Cerelose—20.0 g.
NaCl—2.5 g.
$CaCO_3$—10.0 g.
$H_2O$—1000 ml.
pH—7.0

The fermentation can be carried out at temperatures ranging from about 20–37° C. For optimum results, it is found most convenient to conduct these fermentations at temperatures of about 28° C.

Although histidomycins are produced by both surface and submerged cultures, it is presently preferred to carry out the fermentation in the submerged state. Small-scale fermentations are conveniently carried out by placing suitable quantities of nutrient mediums in flakes, sterilizing the flask and contents by heating at 120° C., inoculating the flask with either spores or a vegetative cellular growth of *Nocardia histidans*, loosely stoppering the necks to the flasks with cotton and permitting the fermentation to proceed in a constant temperature room at about 28° C. on a shaker for about 2 to 4 days. For large-scale fermentations, it is preferable to conduct the fermentation in suitable tanks provided with an agitator and a means of aerating the fermentation medium. In this method, the nutrient medium is made up in the tank and sterilized by heating at 120° C. for a suitable length of time. After cooling, the sterilized medium is inoculated with a suitable source of vegetative cellular growth of *Nocardia histidans* and the fermentation is permitted to proceed for about 7 to 8 days while agitating and/or aerating the nutrient medium and maintaining the temperature at about 28° C. This method of producing histidomycins is particularly suitable for the preparation of large quantities of these products.

The new antibiotic complex of this invention is composed of two substances, herein called histidomycin A and histidomycin B, which exhibit similar biological properties. The histidomycins are distinguishable from most known antibiotics because they are inactive when assayed in the usual complex organic media, but highly active in chemically-defined media of limited constitution.

The antibiotic potency of broth or purified samples of histidomycin is determined by dis-plate agar diffusion assays in a chemically-defined medium seeded with washed cells of *Escherichia coli* W. The composition of the medium is as follows.

Solution A:
    $K_2HPO_4$—0.7 g.
    $KH_2PO_4$—0.3 g.
    Na citrate·$2H_2O$—0.5 g.
    $MgSO_4·7H_2O$—0.1 g.
    Mono sodium glutamate—12.0 g.
    Agar—15.0 g.
    Distilled water—800 ml.
Solution B:
    Dextrose—2.0 g.
    Methionine—0.02 g.
    Distilled water—200 ml.

The assay is carried out as follows:

Solutions A and B are sterilized separately for 20 minutes at 120° C., cooled to 50° C., combined, and seeded with 5 ml. of OD—0.22 saline-washed *E. coli* suspension per 150 ml. of medium. Assay plates are poured with 5 ml. of medium per 100 mm. diameter petri plate. Filter paper discs of 7 mm. or 13 mm. diameters are soaked in solutions to be assayed, set on the agar surface, and the plates are incubated at 37° C. for 18 hours. Activity is determined as inhibition zone diameters in mm.; one unit being defined as the amount of histidomycin required to give an inhibition zone of approximately 25 mm. in diameter using a 13 mm. paper disc.

A typical dose-response curve for histidomycin A, histidomycin B, or mixtures thereof in the assay procedure is linear over a wide range of concentration when plotted as a semilog function. The slope is identical for both compounds, and 50–50 mixtures, on the basis of activity, were found to be additive in nature. Thus, two parts of either component is equivalent to the mixture of one part of each. This observation indicates the similarity of the two histidomycins.

The antibacterial spectrum, as determined by the agar diffusion assays, is shown in the table below:

ANTIBACTERIAL SPECTRUM OF HISTIDOMYCIN AT CONCENTRATION OF 100 UNITS/ML.

| | Inhibition zone diameters, mm. | | |
|---|---|---|---|
| | Histidomycin A | Histidomycin B | Mixture |
| *Escherichia coli* W ATCC 9637 | 42 | 37 | 39 |
| *Bacillus* sp. MB-633 [1] | 19 | 23 | 25 |
| *Serratia marcescens* 990 | 21 | 22 | 25 |
| *Bacillus subtilis* MB-964 [1] | 18 | 28 | 29 |
| *Xanthomonas vesicatoria* MB-815 [1] | 33 | 32 | 35 |
| *Staphylococcus aureus* 6538P [2] | 18 | 15 | 18 |

[1] Cultures from Merck Culture Collection.
[2] Sterile horse serum was added (10% by volume) to the medium to permit growth of these test organisms.

NOTE.—Agar diffusion assays performed with 7 mm. discs on chemically defined medium.

It is clear from the foregoing table that histidomycins A and B exhibit similar spectra, with the exception that the preparation of histidomycin B is relatively more active than the A component against *B. subtilis*. The mixture of A and B on an activity basis results in a similar spectrum of anticipated potency.

The cross resistance pattern of the histidomycins is characteristic and indicative of the similarity of components A and B. The results of the cross resistance test performed with a series of antibiotic-resistant strains of *E. coli* is shown in the table below.

CROSS RESISTANCE PATTERN OF HISTIDOMYCINS AT CONCENTRATION OF 100 UNITS/ML.

| | Diameter of inhibition zones in mm. | | |
|---|---|---|---|
| *Escherichia coli* W strain | Histidomycin A | Histidomycin B | Mixture |
| Sensitive parent | 42 | 37 | 39 |
| Streptomycin-resistant | 35 | 34 | 40 |
| Streptothricin-resistant | 32 | 36 | 34 |
| Cycloserine-resistant | 37 | 35 | 35 |
| Pleocidin-resistant | 48 | 46 | 46 |
| Chloramphenicol-resistant | 20 | 22 | 23 |
| Chlortetracycline-resistant | 30 | 30 | 36 |
| Oxytetracycline-resistant | 32 | 33 | 33 |
| Neomycin-resistant | 40 | 37 | 40 |
| Grisein-resistant | 35 | 33 | 32 |

NOTE.—Tests were performed by agar diffusion in chemically defined medium with 7 mm. filter paper discs soaked in the antibiotic and placed on thin layer assay plates which were incubated overnight at 37° C.

The mixture of histidomycin A and histidomycin B is active in vivo in mice against *Salmonella Schottmuelleri* intraperitoneally, by subcutaneous injection, and orally. Thus, when female 23–25 gram mice infected intraperitoneally with three 30 LD–50 doses of *Salmonella schottmuelleri* suspended in mucin are treated at 0, 6, and 24 hours after infection, the $ED_{50}$ in micrograms per dose is found to be 19 intraperitoneally and 53 subcutaneously.

The antibiotic complex histidomycin produced by the cultivation of *Nocardia histidans* is composed of two substances A and B which exhibit similar properties.

The presence of histidomycin A and histidomycin B in the active concentrates recovered from fermentation broths can be demonstrated by paper electrophoresis. When these antibiotics, together or individually, are examined by paper electrophoresis at 600 volts for 6 hours with 0.25 N pH 7 phosphate buffer (using Schleicher and Schuell No. 598 paper), histidomycin A migrates as an anion (7.5 cn. from the origin), whereas histidomycin B does not migrate. Histidomycins A and B are amphoteric substances; histidomycin A reacting as a slightly more acidic substance than histidomycin B. Both products contain the elements carbon, hydrogen, nitrogen, oxygen and non-ionic chlorine.

Histidomycin can be isolated from fermentation broths by filtering the fermentation broths at a pH of 7–8, adjusting the filtrate to pH 5 with mineral acid, adsorbing the antibiotic on a strongly acidic cation exchange resin, and eluting the resulting adsorbate with dilute ammonia. The resulting eluate is collected and those fractions containing bio-activity are concentrated under diminished pressure to about one-tenth volume and adjusted to pH 4 with mineral acid. The solution of the antibiotic obtained in this way is found to contain an activity of about 800 units per mg. of solids.

The mixture of histidomycins A and B obtained as described above can be separated to isolate histidmycin A and histidomycin B by adjusting the pH to about 10 with a strong base, adsorbing the activity on a strongly basic anion exchange resin, fractionally eluting the adsorbate with a pH 9.3 pyridine-N-ethylmorpholine buffer, and recovering histidomycin A and histidomycin B from selected fractions. The histidomycin A so obtained can be further purified by chromatography on cellulose using the system n-butanol-water-acetic acid to obtain fractions from which histidomycin A in substantially pure form can be recovered by removing the solvent. The product so obtained can be dissolved in water and histidomycin A precipitated in crystalline form by the addition of ethanol.

Histidomycin A crystallizes in the form of fine hairlike needles melting at about 195° C. with decomposition. The crystalline product is optically active and has the following rotations: $[\alpha]_D$ −39.3° (c.=2.28 in water); −39.8° (c.=2.79 in 0.1 N hydrochloric acid); and −36.9° (c.=2.61 in pH 10 aqueous solution). It is readily soluble in water, very sparingly soluble in ethanol, and insoluble in chloroform, ether, and benzene. The ultra-violet spectrum shows only end adsorption. The infrared spectrum is shown in FIG. 1. This infrared spectrum was taken on a Perkin-Elmer spectrophotometer in Nujol mull using a sodium chloride prism and showed a number of characteristic peaks, the more significant of which are at the following wave lengths expressed in reciprocal centimeters (cm.$^{-1}$) 3490, 3250, 3070, 1695, 1670, 1620, 1560, 1540, 1390, 1340, 1195, 1100–1110, 1060–1085, 995, 945 and 700.

Histidomycin A contains the elements carbon, hydrogen, nitrogen, oxygen and non-ionic chlorine. Analysis of a typical sample of crystalline histidomycin A was found to be carbon 45.5%, hydrogen 5.3%, nitrogen 19.1%, chlorine 5.4%, and oxygen 24.7% by difference. The empirical formula calculates to $C_{25}H_{36}N_9O_{10}Cl$.

Paper strip analysis of the hydrolysis products of histidomycins A and B hydrolyzed with 6 N hydrochloric acid at 110° C. for 18 hours in a sealed tube gave 3 ninhydrin reacting spots from the hydrolysis reaction product. L-histidine was isolated and identified by elemental analysis, melting point, and a comparison of its optical rotatory dispersion properties with an authentic sample of L-histidine.

The histidomycins of the present invention are useful antimicrobial agents. For example, they can be utilized to remove susceptible microoragnisms from pharmaceutical equipment and the like. This new antibiotic can also be used in the treatment and control of plant diseases. For example, histidomycins are effective in eradicating leaf rust of wheat when infected plants are treated with a spray containing 100 p.p.m. of histidomycin.

The following examples are given to illustrate methods of preparing, recovering, and purifying the new antibiotics of this invention.

EXAMPLE 1

A cell suspension is prepared by the addition of 10 ml. of sterile 0.9% NaCl solution to an agar slant culture of *Nocardia histidans* ATCC 21021 on a medium of the following composition:

Yeast extract—10.0 g.
Glucose—10.0 g.
Phosphate buffer [1]—20.0 ml.
$MgSO_4 \cdot 7H_2O$—0.05 g.
Agar—20.0 g.
Distilled $H_2O$—1000.0 ml.

[1] See the following table:

Phosphate buffer
$KH_2PO_4$—91.0 g.
$Na_2HPO_4$—95.0 g.
Distilled $H_2O$—1000.0 ml.
pH—7.0
(Tubed, sterilized by autoclaving 20 minutes at 15 lb. pressure and slanted.)

One ml. of such a cell suspension is used to inoculate a 250 ml. Erlenmeyer flask containing 50 ml. of a sterile medium of the following composition:

Beef extract—3.0 g.
Casein hydrolysate (NZ amine)—10.0 g.
Dextrose—10.0 g.
NaCl—5.0 g.
Distilled water—1000.0 ml.
pH—7.2

The inoculated flask is incubated on a rotary shaker at 28° C. for 72 hours. This inoculum is used to seed each of a series of 2 liter Erlenmeyer flasks containing 350 ml. of sterile fermentation medium with 10.5 ml. of vegetative growth. This fermentation medium has the following composition:

Dextrose—10.0 g.
Asparagine—1.0 g.
$K_2HPO_4$—0.1 g.
$MgSO_4 \cdot 7H_2O$—0.5 g.
Yeast extract—0.5 g.
Trace element mix [1]—10.0 ml.
Distilled water—1000.0 ml.
pH—7.2

[1] See the following table:

Trace element mix
$FeSO_4 \cdot 7H_2O$—1.0 g.
$MnSO_4 \cdot 4H_2O$—1.0 g.
$CuCl_2 \cdot 2H_2O$—0.025 g.
$CaCl_2$—0.10 g.
$H_3BO_3$—0.056 g.
$(NH_4)_6MoO_2 \cdot 4H_2O$—0.019 g.
$ZnSO_4 \cdot 7H_2O$—0.20 g.
Distilled $H_2O$—1000.0 ml.

The 2 liter flasks are incubated at 28° C. on a rotary shaker for 72 hours. At the end of the incubation period the contents of ten such flasks are combined and a sample centrifuged to remove the mycelium. This filtered broth sample gives an inhibition zone of 32 mm. when assayed versus *Escherichia coli* W by the agar plate disc-diffusion method previously described.

EXAMPLE 2

The production of larger quantities of histidomycin can be carried out as follows:

10 ml. of a cell suspension of *n. histidans* ATCC 21021 prepared in accordance with the procedure of Example 1 is added to a 25 ml. non-baffled Erlenmeyer flask containing 50 ml. of a sterile aqueous medium consisting of meat extract, 0.3%; sodium chloride, 0.5%– casein hydrolysate (NZ amine), 1%; distiller's solubles, 1%; having a pH of 7.0–7.2. The flask is then stoppered with cotton and incubated for 24–48 hours at 28° C.

10 ml. of the resulting culture is then added to a 2 liter baffled Erlenmeyer flask containing 500 ml. of the same medium per flask and incubated for 48 hours on a rotary shaker at 28° C.

The entire culture thus produced is then added to a 50 gallon stainless steel fermentor containing 160 liters of a sterile aqueous medium containing distiller's solubles, 1%; asparagine, 0.1%; $K_2HPO_4$, .01%; $MgSO_4·7H_2O$, 0.05%; yeast extract, 0.05%; trace element mix, 1.0% (as in Example 1); having a pH of 7.2. The culture is incubated for 70 hours at 28° C. During this incubation period, the medium is agitated and sterile air passed through the medium at a rate of 3 c.f.m.

A 200 gallon stainless steel fermentor is then charged with 510 liters of an aqueous medium containing soybean meal, 3%; distiller's solubles, 0.75%; glucose, 2.0%; sodium chloride, 0.25%; calcium carbonate, 1%. After sterilization, the medium is inoculated with 8.3% of the inoculum prepared in the 50 gallon fermentor described above. The batch is then incubated at 28° C. for 180 hours. During this incubation period, the medium is agitated and sterile air passed through the medium at a rate of 10 c.f.m. At the end of this period, the pH has changed from 6.4 at the beginning of the fermentation to 8.9 at the conclusion of the fermentation. The harvested broth has an activity of 50 units/mg. of solids when assayed with *Escherichia coli* W.

EXAMPLE 3

A histidomycin broth having an activity of 50 units/mg. of solids prepared as described in Example 2 is filtered at pH 7–8. The resulting filtrate is adjusted to pH 5 with hydrochloric acid and the histidomycin is adsorbed by passing through a column containing 1/50 volume of a strongly acidic cation exchange resin on the sodium cycle prepared by the nuclear sulfonation of styrene divinylbenzene beads sold under the trade name Dowex 50x2 by the Dow Chemical Company. The resin adsorbate is washed with water and then eluted with four resin volumes of 0.2 N ammonia. The eluate is collected in three fractions, (1), the first gallon; (2), the next 14 gallons; and (3), the final 25 gallons. The first fraction is concentrated to a volume of about 300 ml. and adjusted to pH 4. This concentrate has a solid content of 257.3 mg./ml. and an activity of about 800 units/mg. when assayed against *E. coli* W as described above. Fractions two and three are concentrated to about 6.1 and 2.3 liters and found to have solid contents of 87.7 and 37.7 mg./ml. respectively. Assay of these fractions showed an activity of about 450 units/mg. and 40 units/mg. respectively. The concentrates of each of the fractions is found to contain both histidomycin A and histidomycin B as determined by paper electrophoresis.

EXAMPLE 4

A 50 ml. aliquot of the aqueous concentrate obtained from fraction one as described in Example 3 containing 12.8 g. of solids having an activity of 800 units/mg. is adjusted to pH 10 with sodium hydroxide and then adsorbed on 2 liters of a strongly basic anion exchange resin in the acetate form, said resin incorporating quaternary ammonium functionality, the four substituents on the nitrogen being a polymeric benzyl group and three methyl groups. This resin is sold under the trade name Dowex 1X2 by the Dow Chemical Company. The resin adsorbate is then eluted with pH 9.3 pyridine-N-ethylmorpholine buffer and after 590 ml. of eluate is collected, gradient elution is started using 0.5% acetic acid and 200 20-ml. fractions are collected.

Fractions 165–174 containing histidomycin A are combined and freeze-dried to yield 4.7 g. of solids. Fractions 145–158 containing histidomycin B are combined and freeze-dried to yield 6.6 g. of solids. The histidomycin A and histidomycin B obtained in this way have an activity of about 800 units/mg.

The histidomycin A obtained in this manner is further purified by chromatography on cellulose using the system n-butanol-water-acetic acid (4–1–1). A dispersion of cellulose powder (Whatman CF 11) in the above solvent is poured into a 5 x 150 cm. column containing 1 liter of solvent. The column is gravity packed and washed thoroughly. 6 grams of crude histidomycin A having an activity of 800 units/mg. is dissolved in 180 ml. of the butanol-water-acetic acid solvent system and passed through the cellulose column. The further development and elution of the column is carried out with the same solvent mixture. After taking a precut of 2.5 liters, 260 10-ml. fractions are collected and assayed. Fractions 200–255 show a well-defined distribution peak and contain the major portion of the bioactivity. These fractions are combined and evaporated to dryness in vacuo to yield 1.71 g. of solids. The solids are added to 5 ml. of water and a small amount of insoluble material separated from the solution by filtration. To the resulting filtrate is added 15 ml. of ethanol to produce a slightly turbid solution. Crystallization of histidomycin A begins after a short time and is allowed to continue for 18 hours. The crystalline material is separated by centrifugation, washed with several 5 ml. portions of ethanol and dried to yield 800 mg. After a second recrystallization from water by the addition of ethanol, the fine, hairlike needle crystals of histidomycin A have an activity of 8000 units/mg.

Histidomycin B is purified in the same manner as described for bistidomycin A. Thus, 2.5 g. of crude histidomycin B (obtained as described above) is chromatographed on cellulose in the same manner as described above for the A form. After discarding a forerun of 850 ml., 10-ml. fractions are taken and assayed. Fractions 167–200, which contain the major portion of the bioactivity, are combined and evaporated to dryness in vacuo to yield 400 mg. of purified histidomycin B having a potency of 5,000 units/mg.

What is claimed is:
1. Histidomycin A characterized by the following properties:
    (a) crystallizing in the form of needles melting at about 195° C. with decomposition;
    (b) being optically active and exhibiting the following rotations: $[\alpha]_D^{25}$ —39.3° at a concentration of 2.28 in water, —39.8° at a concentration of 2.79 in 0.1 N hydrochloric acid, and —36.9° at a concentration of 2.61 in pH 10 aqueous solution;
    (c) being soluble in water, very sparingly soluble in ethanol, and insoluble in chloroform, ether, and benzene;
    (d) having characteristic absorption in the infrared region at the following frequencies expressed in reciprocal centimeters: 3490, 3250, 3070, 1695, 1670, 1620, 1560, 1540, 1390, 1340, 1195, 1100–1110, 1060–1085, 995, 945, and 700;
    (e) containing about 45.5% carbon, 5.3% hydrogen, 19.1% nitrogen, 5.4% chlorine, and 24.7% oxygen (by difference); and
    (f) having a calculated empirical formula of

$$C_{25}H_{36}N_9O_{10}Cl$$

2. Histidomycin, an antibiotic complex consisting of two active components Histidomycin A and Histidomycin B, prepared by a process which comprises growing *Nocardia histidans* ATCC 21021 under aerobic conditions in an aqueous nutrient medium containing an assimilable source of carbon, nitrogen, and inorganic salts until substantial antibiotic activity is imparted to said medium, and recovering the histidomycin complex from the fermentation broth by filtering the broth, acidifying the filtrate with a mineral acid to pH 5, absorbing the antibiotic on an acid cation exchange resin, eluting the resin with ammonia, and acidifying the eluate to $pH_4$.

3. Histidomycin B prepared by a process which comprises growing *Nocardia histidans* ATCC 21021 under aerobic conditions in an aqueous nutrient medium containing an assimilable source of carbon, nitrogen, and inorganic salts until substantial antibiotic activity is imparted to said medium, filtering the broth, acidifying the filtrate with a mineral acid to pH 5, absorbing the antibotic on an acid cation exchange resin, eluting the resin with ammonia, acidifying the eluate to pH 4, adjusting the mixture to pH 10 with sodium hydroxide, absorbing the antibiotic on a basic anion exchange resin, eluting the resin with pyridine-N-ethyl-morpholine buffer, and recovering Histidomycin B from the eluate.

References Cited

Antimcrobial Agents and Chemotheraphy—1966, pp. 595-605 (June 30, 1967).

JEROME D. GOLDBERG, Primary Examiner

U.S. Cl. X.R.

195—80; 424—115